United States Patent
Holmes

(10) Patent No.: US 6,706,382 B2
(45) Date of Patent: Mar. 16, 2004

(54) MOLDED AND LAMINATED CURVED SURFACE COMPOSITES

(75) Inventor: Stewart M. Holmes, Grantham, NH (US)

(73) Assignee: CRX Limited, Grantham, NH (US)

( * ) Notice: Subject to any disclaimer, the term of this patent is extended or adjusted under 35 U.S.C. 154(b) by 0 days.

(21) Appl. No.: 10/304,981

(22) Filed: Nov. 26, 2002

(65) Prior Publication Data

US 2003/0129377 A1 Jul. 10, 2003

Related U.S. Application Data

(63) Continuation-in-part of application No. 09/520,674, filed on Mar. 7, 2000, now Pat. No. 6,534,165, which is a continuation-in-part of application No. 09/034,695, filed on Mar. 4, 1998, now Pat. No. 6,099,782, which is a continuation-in-part of application No. 08/597,164, filed on Feb. 5, 1996, now Pat. No. 5,783,228.

(51) Int. Cl.$^7$ ............................ B32B 3/06; B32B 3/26; B29C 67/00

(52) U.S. Cl. ................. 428/306.6; 428/159; 428/304.4; 428/306.6; 264/46.7; 264/250; 264/266

(58) Field of Search ............................. 428/306.2, 158, 428/157, 318.6, 318.8, 304.4, 308.8; 264/250, 266, 46.7

(56) References Cited

U.S. PATENT DOCUMENTS 3,991,146 A * 11/1976 Barrie ........................ 264/46.7
6,238,302 B1 * 5/2001 Helmstetter et al. ........ 473/340
6,534,165 B1 * 3/2003 Holmes .................... 428/306.6

* cited by examiner

Primary Examiner—Lynne R. Edmondson
(74) Attorney, Agent, or Firm—Grossman, Tucker, Perrault & Pfleger, PLLC

(57) ABSTRACT

A molded article having a curved surface is formed from a heat curable reactive thermoset polymer resin powder containing an integrally formed insert bonded therein. The integrally formed insert may be threaded for subsequent attachment of the molded article to a frame or structure. The insert is partially surrounded by a boss with supporting features to ensure that the insert is orthogonally supported.

8 Claims, 4 Drawing Sheets

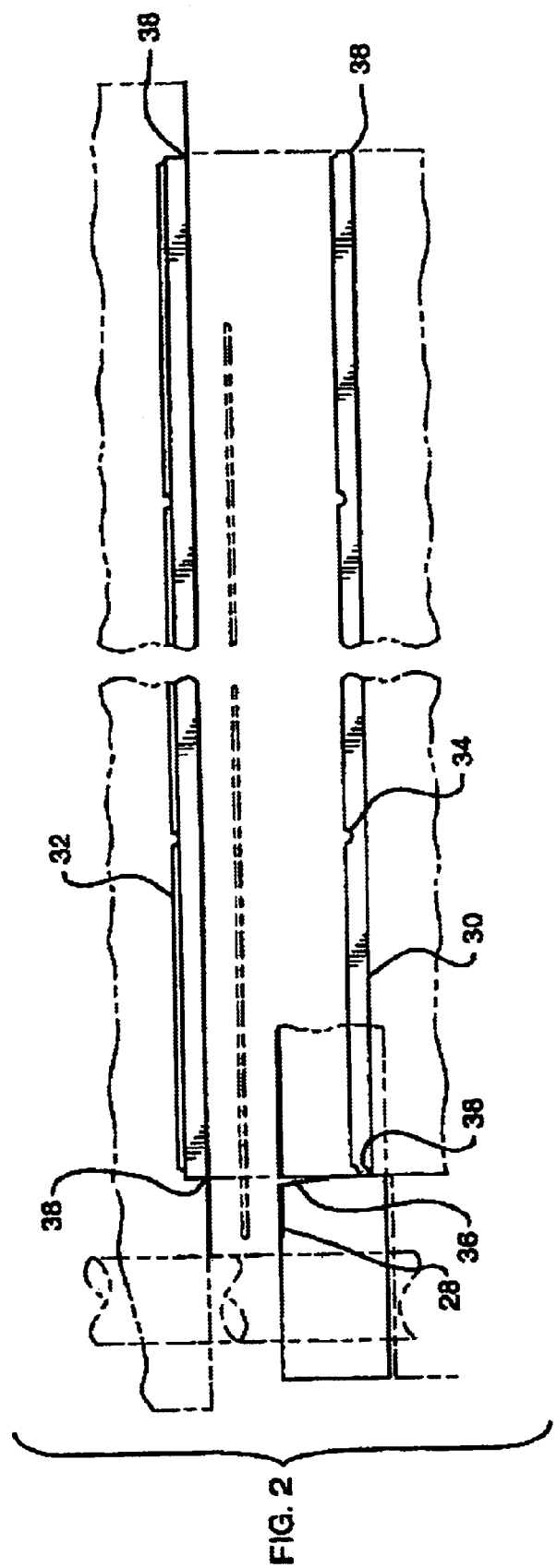

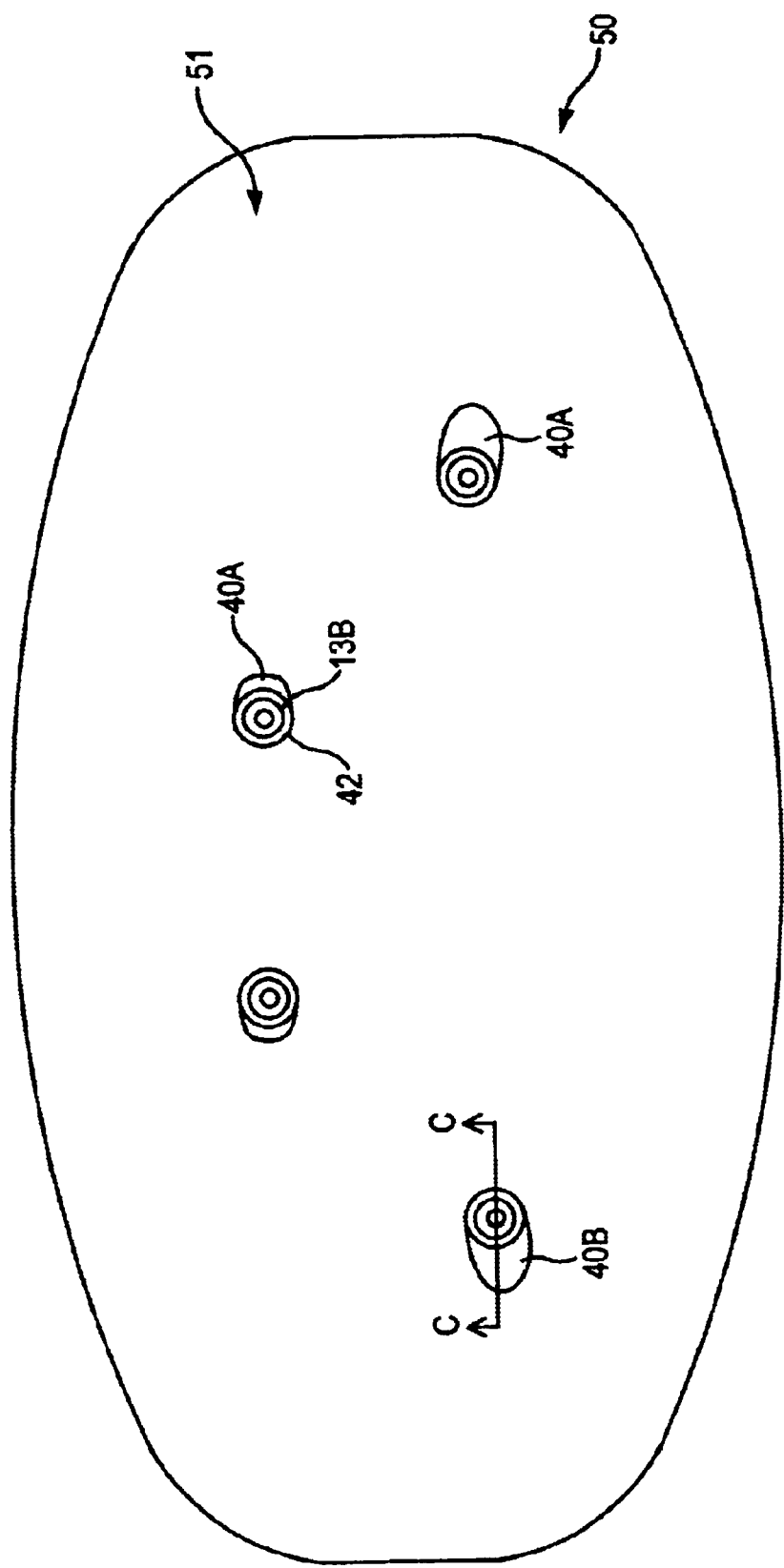

MOLDED AND LAMINATED CURVED SURFACE COMPOSITES

CROSS REFERENCE TO RELATED APPLICATIONS

This application is a continuation-in-part of U.S. application Ser. No. 09/520,674 filed Mar. 7, 2000 now U.S. Pat. No. 6,534,165, which is a divisional of U.S. application Ser. No. 09/034,695 filed Mar. 4, 1998, now U.S. Patent No. 6,099,782, which is a divisional of U.S. application Ser. No. 08/597,164 filed on Feb. 5, 1996, now U.S. Pat. No. 5,783,228.

BACKGROUND OF THE INVENTION

The present invention relates to a product and method for producing a curved surface composite material wherein a thermoset composite is manufactured containing a paper overlay characterized in that the paper is pressed into the composite material a desired amount, without rupturing or tearing of said overlay in the molding process. Accordingly, the present invention provides a composite material with a paper overlay characterized in that the paper is readily pressed into grooves in the composite, therein providing the ability to manufacture a composite material ideally suited for such applications as the preparation of a composite tile panel, with a decorative overlay design.

In the context of the present invention, it is noted that molded thermoset products are well known in the art, specifically, products manufactured from plastic materials generally known as amino resins, or phenolic resins and the like. Such thermoset materials ordinarily are molded by the techniques of compression molding, given the fact that such resins are in fact commercially available as molding powders and are known to cure in the presence of heat to provide a crosslinked material of relatively high strength and stiffness. In accordance with the manufacture of such resins by such procedures, it is common to incorporate various fillers and additives, to both improve the processing characteristics and to improve or modify the properties of the resins after they are cured.

In addition, laminates of the above resins have been prepared, wherein a decorative laminate made or derived from paper, is bonded or adhered to the resin during cure and molding. Typically, the paper itself is porous, and may contain some of the resin so that it binds chemically to the molded product and provides a decorative aspect not available by the resin on its own.

However, numerous problems have been encountered in regards to preparing curved surfaces, as it can be appreciated that in the molding process, the laminate would necessarily have to remain protruding over the edge of the molding powder to be curved, in order to provide the necessary surface area to cover the final molded product on its edge side. Conventional compression molds do not accommodate such overlapping paper laminate, and if the paper is allowed to sit on top of the molding powder in a conventional compression mold design, the paper will be pinched by the mold cavity itself prior to being drawn into the mold and associated or bonded with the curved edge and incorporated into the molded product.

In addition, one long-standing problem with the production of a curved surface laminate, although such problem also exists in non-curved products, is the preparation of a laminate containing integral reinforcing type ribs which themselves contain an insert in the rib for receipt of a screw or other attachment means to connect to a frame. That is, the prior art to date has not been able to successfully incorporate such inserts into composite materials during molding thereof.

Therefore, it is an object of the invention to overcome the disadvantages of the prior art and provide both a mold design which allows for a decorative laminate overlay to be drawn into the mold during the molding cycle without being stretched or torn in the overall molding process.

More specifically, it is an object of the invention to provide a mold for the compression molding of thermoset polymer resins, although other resins are contemplated, including thermoplastic resins, wherein the mold contains a region for the placement of an overlapping paper laminate, that can be drawn into the mold, and applied to a curved surface, in a manner that does not stretch or tear the laminate paper material.

Furthermore, it should be noted that it is an object of the present invention to prepare an integrally molded product having a curved surface, characterized in that the product is formed of a polymer or plastic material, and a laminating layer is affixed to the polymer or plastic material, in an integral manner.

Finally, it is also an object of this invention to prepare a composite material part containing a performed insert which becomes part of the molded part and produces a site for attachment of said part to a frame or similar structure.

SUMMARY OF THE INVENTION

A molding press for simultaneously molding a product and laminating a pattern layer to the surface of the molded product comprising a bottom mold plate, a top mold plate, a mold ring element surrounding the mold plates and moveable independently of the top and bottom mold plates, an upper surface on said mold ring for engaging a peripheral edge of the top mold plate, and a flat groove in said mold ring upper surface which is slightly deeper than the thickness of a pattern layer to be laminated to the top surface of the final molded product.

In process form, the present invention provides a process for simultaneously molding a product and laminating a pattern to the surface of the molded product comprising the use of a mold having a bottom mold plate, a top mold plate, a mold ring element surrounding the mold plate and moveable independently of the upper and lower mold plates, wherein the edges of said top mold plate overlap an inner portion of the mold ring element providing a flat space between adjacent surfaces of the said mold plate and said mold ring element, followed by supporting said pattern layer at its edges in said flat space while maintaining the space slightly thicker than the thickness of the pattern layer so that said layer is free to slide laterally across the upper surface of said mold ring towards the mold interior during the molding process, followed by filling the volume provided by the lowered bottom mold plate and the mold ring to the level of the inner edge of the mold ring with a heat setting molding powder, raising said lower mold plate to compress and cure the molding powder and laminating said pattern to the upper surface of said cured molded product.

In product form, the present invention comprises and integral molded product having a curved surface to which is bonded a pattern layer, said molded product being formed of a heat curable reactive polymer resin and said pattern layer including a porous structure into which said reactive polymer resin penetrates and cures to unify or bond the pattern layer and the curved molded project surface.

In addition, the present invention discloses an integral formed molded product said molded product being formed of a heat curable reactive polymer resin containing an integrally formed reinforcing rib including an insert in said rib which bonds to said heat curable reactive polymer resin during molding thereof, and which insert provides means for attaching said integrally formed product to a frame or support structure.

In addition, in further alternative embodiment, the present invention is directed at an integral formed molded product with a convex surface, said molded product being formed of a heat curable reactive thermoset polymer resin molding powder containing an integrally formed insert which bonds to said heat curable reactive thermoset polymer resin during molding thereof, and which insert provides attachment of said integrally formed product to a frame or support structure, including a boss with a top projecting from said convex surface, a supporting feature supporting said boss which supporting feature extends from the top of said boss to said convex surface.

Finally, in alternative embodiment, the present invention is directed at a method for forming an integral formed molded product with a convex surface, comprising supplying a heat curable reactive thermoset polymer resin molding powder, supplying an insert which bonds to said heat curable reactive thermoset polymer resin, supplying a mold with a convex shape including openings to receive said insert during molding thereof, securing said insert to said mold wherein said mold includes a cavity which forms a boss on said molded product which boss projects from said convex surface, said cavity forming a supporting feature supporting said boss which supporting feature extends from the top of said boss to said convex surface, and curing said heat curable reactive thermoset polymer resin molding powder to formed said product.

BRIEF DESCRIPTION OF THE DRAWINGS

A preferred construction for a molding press in accordance with the present invention is illustrated in the accompanying drawings wherein:

FIG. 2 is an exploded view of a molding press, illustrating the use of the present invention for the manufacture of a tile slab wherein a decorative laminate overlay is pressed into the grooves of the tile; without stretching or tearing.

FIG. 4 is a plan view of a product formed from the mold in FIG. 3 looking in the direction of arrow A illustrating the shape of the bosses of this invention.

DETAILED DESCRIPTION OF THE PREFERRED EMBODIMENTS

Figure 1:
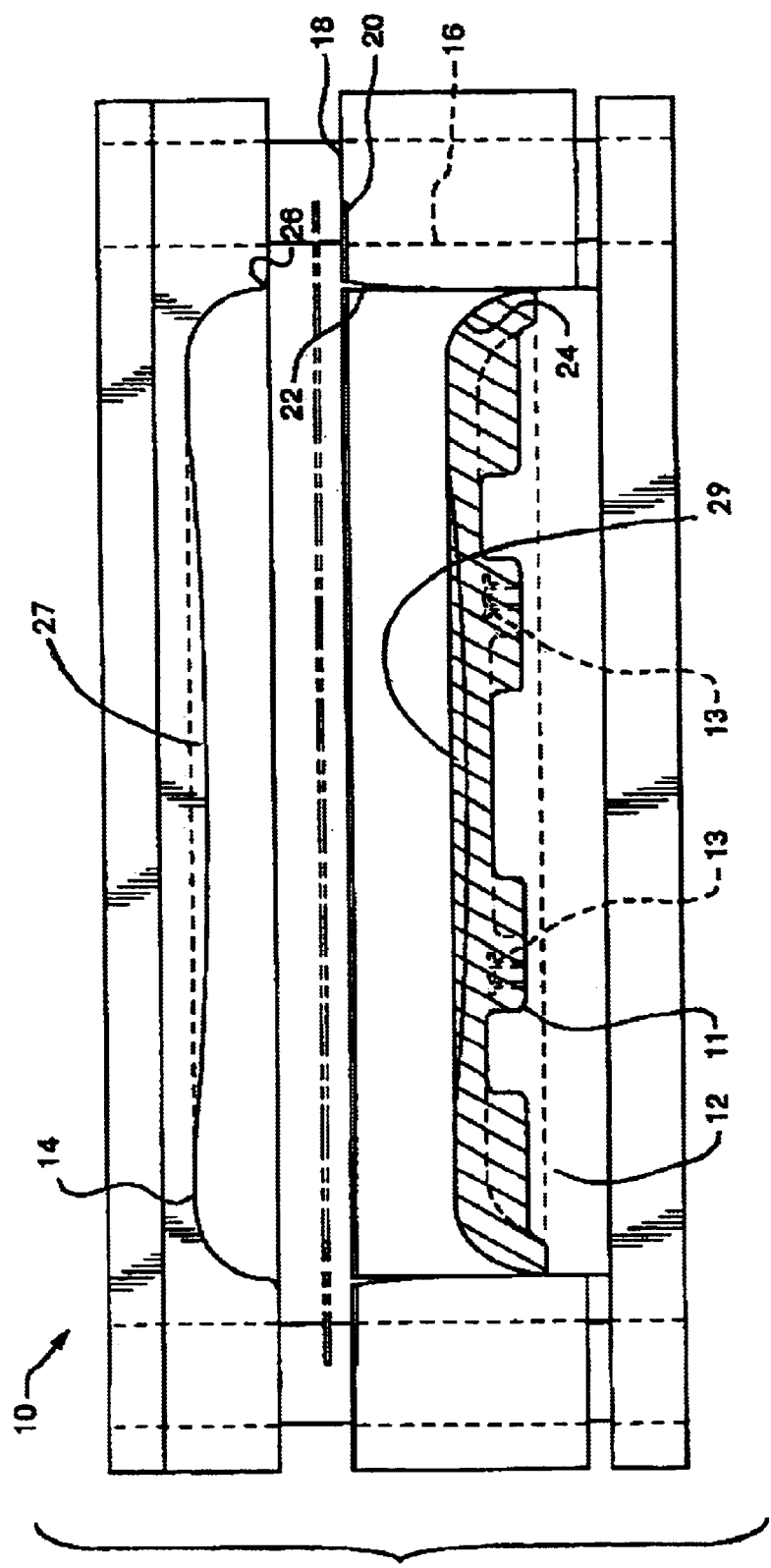
FIG. 1 is an exploded view of the molding press, illustrating the mold ring element and its location for supporting the laminate to be affixed to the curved surface of a molded product.

With reference to the drawings, FIG. 1 provides a view of the preferred molding for preparing the integrally shaped or molded product of the present invention. More specifically, as shown in FIG. 1, the mold 10 comprises a bottom mold plate 12, a top mold plate 14, a mold ring element 16 surrounding the mold plates and moveable independently of the top and bottom mold plates, an upper surface 18 on said mold ring for engaging a peripheral edge of the top mold plate, and a flat groove 20 in said mold ring upper surface which is slightly deeper than the thickness of a pattern layer to be laminated to the top surface of the final molded product.

With reference to FIG. 1, it should be noted that in a preferred embodiment, the flat groove 20 is about 0.025 inches deep in opening (i.e., the opening created and available for the laminate overlay when the mold is closed) and runs 0.50 inches–1.5 inches horizontally into the ring. In addition, it should be noted that there is a taper along the length of the mold shown generally at 22, preferably about 2–55 degree taper, which taper runs 0.5–2.0 inches vertically, and which makes it easier for the paper to effectively be drawn into the mold and assume the rounded edge configuration of the molded part shown generally at 24. In addition, it is preferable to incorporate a rounded edge 26 on the top mold plate, which preferably has a radius of not less than 0.150 inches, and which serves to draw the laminate into the mold and onto the rounded edge of the molding resin, in the molding cycle, without stretching and/or tearing. Furthermore, it may be desirable to incorporate a convex region, shown generally at 27 on the top mold plate, which serves to create a concave region 29 on the final molded part.

In addition, FIG. 1 shows at 11 an integral rib which reinforces the molded seat product illustrated. Also shown is insert 13 placed into the rib which becomes part of the molded rib or surface and provides a site for attachment to a frame or similar structural support. Preferably insert 13 is a metal insert with internal threads to accommodate screw-type mounting and attachment.

As noted above, FIG. 2 shows yet another preferred embodiment of the present invention illustrating the use of a mold suitable for the preparation of a tile slab wherein a decorative laminate overlay is pressed into the grooves of the tile, without stretching or tearing. Specifically, a flat groove is shown at 28, along with the bottom mold plate 30, top mold plate 32, with the groove location on the bottom plate shown generally at 34. It can be appreciated that when the bottom and top mold plates are brought together, the laminate paper can be pressed into the mold, into the groove 34, without rupture, inasmuch as the paper laminate rests, prior to molding in groove 28. In such manner, a decorative design of any desired type can be configured and located on the tile face, and the corresponding grout line drawn on the decorative laminate which contains no decorative design itself is pressed into the groove 34 thereby producing a tile slab that in many respects simulates the effect one achieves by putting together tile sections, by a grouting operation. Accordingly, the present invention provides a panel, or as described earlier, a slab of compression molded material that simulates tile appearance, but avoids the disadvantages of tile installation.

In connection with FIG. 2, the flat groove is preferably 0.025 inches deep in opening and runs 0.5–1.5 inches horizontally into the ring. In addition, a taper is present at 36, preferably about 2–5 degrees, which as previously noted in the earlier mentioned embodiment, assists and makes it easier to draw the paper inwardly. The taper runs preferably 0.50–1.0 inches from the top of the ring when molding decorative overlay tile. Also shown at 38 is a rounded edge on the top cavity which preferably includes a radius of not less than 0.060 inches, which assists in drawing paper around the tile being molded.

In another embodiment, which is based upon the use of an insert for attachment purposes, and as illustrated in FIGS.

Figure 3:
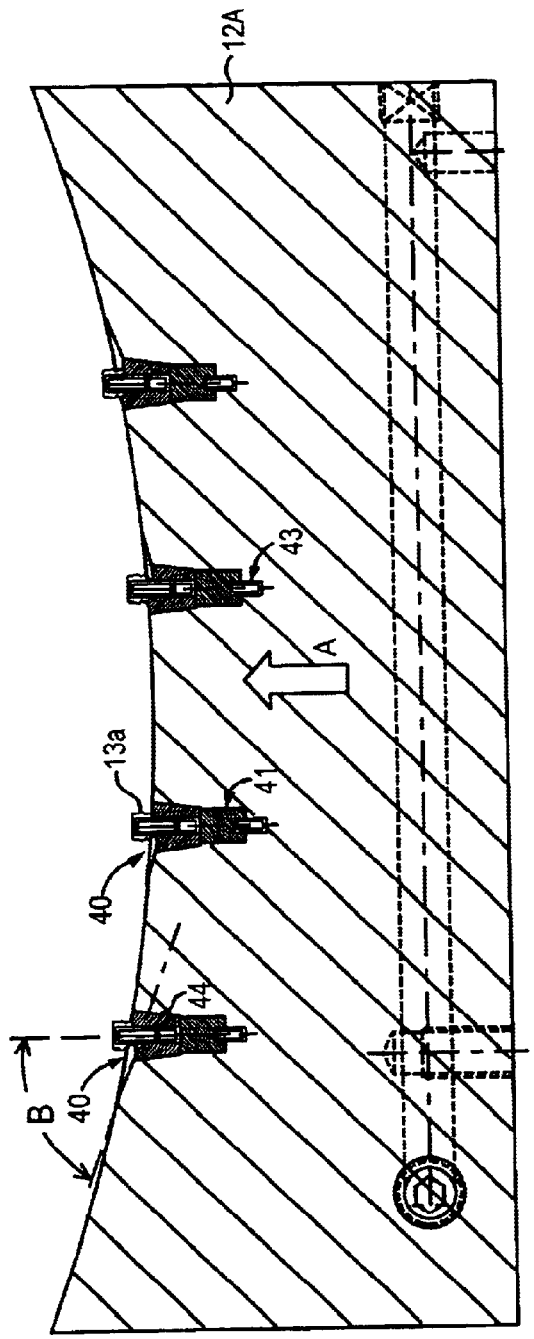
FIG. 3 is a sectional view of the mold base of a compression mold illustrating the inserts held in place before being integrally molded.

3–5, a means for further assuring accurate and repeatable alignment of attachment inserts have been provided. In a product having a convex surface which is compression molded using the present invention, it is often difficult to make threaded fasteners align orthogonally with the intended attachment plane of the surface that the molded product may attach to. FIG. 3 shows a cross section of a mold cavity 12A for a convex product showing threaded fasteners 13A preferably oriented at a plane orthogonal to the plane of attachment of the molded product. The fasteners 13A are threaded onto a stud 44 held by a conical plug 42. The plug 42 is located securely in a cavity in the surface of the mold base 12A and is in contact with a magnet 41 which ensures retention of the threaded fasteners 13A during the compression molding process. The magnet 41 is held in the mold base by a threaded set screw 43.

In order to secure accurate and repeatable dimensional alignment of the threaded insert, particularly in an orthogonal plane to the intended plane of attachment, it has been found that creating a conical depression 40 in the mold cavity outboard of each threaded fastener allows a thicker cross-section of molded plastic which strengthens the molded product in that area to ensure orthogonal support and alignment. The depression in the surface of the mold base is shown at 40 in FIG. 3. It has been found that optimal results are achieved when that cavity 40 is formed in the shape of a 60 degree cone (illustrated as angle B in FIG. 3). This adds structure locally to the area surrounding the molded insert.

Figure 5:
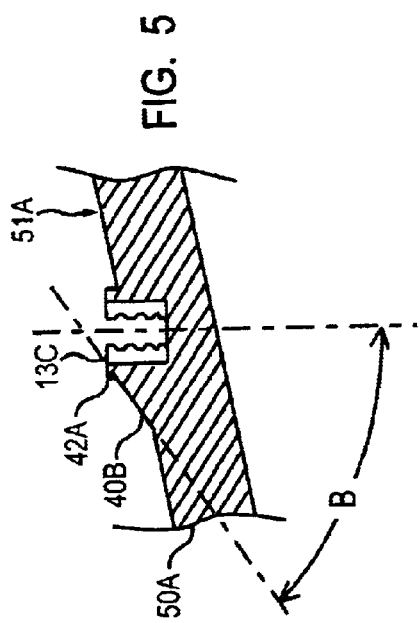
FIG. 5 is an enlarged view of a section taken through the 60 degree conical boss of FIG. 4 looking in the direction of C—C.

FIG. 4 shows the back surface (convex) 51 of the molded product 50 made from the mold in FIG. 3 which contains four bosses 42 which project slightly from the surface 51 and contain threaded inserts 13B. A conical supporting shaped feature 40A is formed locally on the convex surface 51 corresponding to the cavity of the mold base in FIG. 3 in the form of a circumscribed cone of 60 degrees (preferred angle B) from a vertical line projecting outward from the center of the threaded insert. An enlarged cross-sectional view C—C through the 60 degree boss is shown in FIG. 5. The supporting shaped feature 40A supports the bosses 42 in that area where the convex shaped surface does not provide support to the bosses 42.

As shown in FIG. 5, the molded product 50A has a threaded insert 13C bonded in place. The convex surface 51A of the molded product 50A is reinforced in the area 40B outboard of the molded boss 42A in a conical shape and again at about a preferred 60 degree angle with respect to a vertical line projecting outward from the center of the insert 13C. This reinforced area outboard of the boss 42A provides sufficient strength to assure consistent alignment of the threaded insert with its intended attachment plane.

In accordance with the above preferred embodiment, it can be appreciated that the circumscribed cone of the preferred angle of 60 degrees may assume other angles but still provide support to the insert 13C. In that regard, it is contemplated herein that such angle (i.e., angle B) may vary between 30 degrees and 90 degrees, recognizing that at 90 degrees the insert is fully surrounded by material and no cone would be visible. In addition, all 1 degree increments are included. Therefore, the invention herein contemplates a range of angles between 30–90 degrees, e.g. 31, 32, 33 and so forth. Prefereably, the angle is between 30–75 degrees, and more preferably, 45–75 degrees, and in a most preferred embodiment, the angle is 55–65 degrees, and in a highly preferred embodiment, the angle is 60 degrees, plus or minus 2.0 degrees.

Finally, the present invention provides an integral formed molded product comprising a curved surface which is bonded to a pattern or decorative laminate layer wherein the molded product is formed from a heat curable reactive polymer resin. Suitable heat curable reactive polymer resins are those resins generally known as amino resins, which include urea/formaldehyde or melamine/formaldehyde molding resins, or mixtures thereof. Particularly preferred resins in this regard include "Cymel 405LD" or equivalent resin, which is available from Cytec Industries, Inc. However, it should be noted that the present invention is not limited to such amino resins, as practically any thermoset resin that is available as a molding powder would be suitable for preparing the integrally shaped molded product, by the process described herein. In addition, although the resin is preferably heat curable, it can be appreciated that catalytic curing of the resin is an option, wherein the catalyst serves to provide the necessary growth in molecular weight so that the molding resin is advanced into a final cured state. In addition, other components and additives can be added to the resins, either to control the degree of sure, or to modify properties of the resin after curing.

Those skilled in the art will recognize, or be able to ascertain, using no more than routine experimentation, many equivalents to the specific embodiments of the invention described herein. Such equivalents are intended to be encompassed by the following claims.

What is claimed is:

1. An integral formed molded product with a convex surface, said molded product being formed of a heat curable reactive thermoset polymer resin molding powder containing an integrally formed insert which bonds to said heat curable reactive thermoset polymer resin during molding thereof, and which insert provides attachment of said integrally formed product to a frame or support structure, including a boss with a top projecting from said convex surface, a supporting feature supporting said boss which supporting feature extends from the top of said boss to said convex surface, wherein said supporting feature partially surrounds said boss.

2. The integral formed molded product of claim 1 wherein the angle formed by a vertical line projecting outward from the center of said insert and said supporting feature is between 30–75 degrees.

3. The integral formed molded product of claim 1 wherein the supporting feature is of a conical shape.

4. The integral formed molded product according to claim 1, wherein the heat curable reactive thermoset polymer resin molding powder comprises an amino resin based molding powder.

5. The integral formed molded product according to claim 4, wherein the amino resin based molding powder comprises urea/formaldehyde, melamine/formaldehyde, or mixtures thereof.

6. The integral formed molded product of claim 1, wherein said insert is a threaded fastener.

7. The integral formed molded product of claim 1, wherein said insert is retained prior to bonding to said heat curable reactive thermoset polymer resin by a magnet contained in a mold base.

8. A method for forming an integral formed molded product with a convex surface, comprising:
   (a) supplying a heat curable reactive thermoset polymer resin molding powder;
   (b) supplying an insert which bonds to said heat curable reactive thermoset polymer resin;
   (c) supplying a mold with a convex shape including openings to receive said insert during molding thereof;
   (d) securing said insert to said mold wherein said mold includes a cavity which forms a boss on said molded product which boss projects from said convex surface of said molded product, said boss including a top, said cavity forming a supporting feature supporting said boss which supporting feature extends from the top of said boss to said convex surface;

(e) substantially filling said mold with said thermoset polymer resin molding powder, including said cavity forming a supporting feature, and (f) curing said heat curable reactive thermoset polymer resin molding powder to form said product wherein said product includes said boss projecting from said convex surface including said supporting feature supporting said boss which supporting feature extends from the top of said boss to said convex surface.

* * * * *